(12) United States Patent
Jørgensen et al.

(10) Patent No.: US 6,589,688 B2
(45) Date of Patent: Jul. 8, 2003

(54) BATTERY HOLDER WITH INTEGRATED SWITCH

(75) Inventors: Martin Bondo Jørgensen, Smørum (DK); Karsten Videbæk, Roskilde (DK)

(73) Assignee: SonionMicrotronic A/S, Roskilde (DK)

( * ) Notice: Subject to any disclaimer, the term of this patent is extended or adjusted under 35 U.S.C. 154(b) by 94 days.

(21) Appl. No.: 09/820,165

(22) Filed: Mar. 29, 2001

(65) Prior Publication Data

US 2001/0041287 A1 Nov. 15, 2001

Related U.S. Application Data

(60) Provisional application No. 60/192,884, filed on Mar. 29, 2000.

(51) Int. Cl.$^7$ .......................... H01M 2/10; H04R 5/00; H04R 25/00
(52) U.S. Cl. .................... 429/96; 429/97; 429/98; 429/99; 429/100; 429/123; 439/500; 381/23.1; 381/312; 381/323
(58) Field of Search .............................. 429/96, 97, 98, 429/99, 100, 123; 439/500; 381/23.1, 312, 323

(56) References Cited

U.S. PATENT DOCUMENTS

| | | | |
|---|---|---|---|
| 3,641,288 A | * 2/1972 | Lamp | .................... 200/52 |
| 3,701,862 A | 10/1972 | Vignini | |
| 3,745,049 A | 7/1973 | Kaye | |
| 5,188,540 A | 2/1993 | Haertl et al. | |
| 5,367,575 A | * 11/1994 | Dieken et al. | ................. 381/67 |
| 5,588,064 A | 12/1996 | McSwiggen et al. | ...... 381/69.2 |
| 5,687,242 A | 11/1997 | Iburg | ......................... 381/69.2 |
| 6,516,074 B1 | 2/2003 | Brimhall et al. | ............ 381/322 |

OTHER PUBLICATIONS

PCT/DK 01/00209 International Search Report.

* cited by examiner

*Primary Examiner*—Patrick Ryan
*Assistant Examiner*—Angela J Martin
(74) *Attorney, Agent, or Firm*—Harness, Dickey & Pierce, P.L.C.

(57) ABSTRACT

A battery holder for a microelectronic device, said holder comprising a frame having a substantially circular base and a curved portion with an upper and a lower surface. The curved portion encloses at least part of the substantially circular base, and the frame is adapted to hold a battery. A first conductor extends from a first part of the curved portion to a second part of the curved portion, and wherein a first end of the first conductor is positioned within the first part of the curved portion and wherein a second end of the first conductor is positioned within the second part of the curved portion. A movable member is positioned on the curved portion and adapted to provide an electrical connection between the second end of the first conductor and a point of contact within the second part of the curved portion.

10 Claims, 1 Drawing Sheet

BATTERY HOLDER WITH INTEGRATED SWITCH

Figure 1:
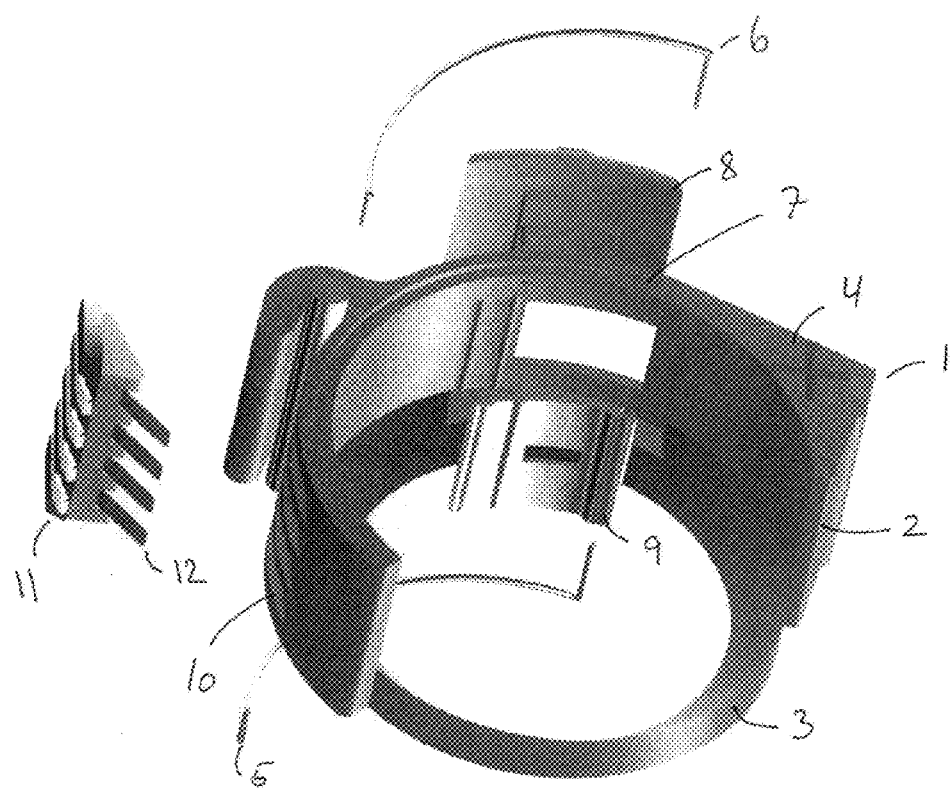

This application claims benefit under 35 U.S.C. §119(e) of U.S. Provisional Application of Martin Bondo Jorgensen, et al., entitled "Battery Holder with Integrated Switch", S No. 60/192,884, filed on Mar. 29, 2000, the entire contents of which is incorporated by reference herein.

The present invention relates to a battery holder with an integrated switch. In particular, the present invention relates to a battery holder suitable for use with hearing instruments.

In the hearing instrument and mobile communication system industry, one of the primary goals is to make components of small sizes while still maintaining good technical performance and operability and simultaneously provide good user friendliness and satisfaction. Technical performance includes sensitivity, noise, stability, compactness, robustness and insensitivity to electromagnetic interference (EMI) and other external and environmental conditions.

The most bulky single component in modern hearing instruments is the battery powering the hearing instrument. Another space consuming component is a switch/contact used for communicating with the hearing instrument—e.g. during programming.

It is an object of the present invention to provide a battery holder with an integrated multifunctional switch for a hearing instrument. By integrating the multi-functional switch with the battery holder the overall dimensions of the hearing instrument is reduced.

Furthermore, the user friendliness is significantly increased. The above-mentioned object is complied with by providing a battery holder for a microelectronic device, said battery holder comprising:

a frame having a substantially circular base and a curved portion with an upper and a lower surface, said curved portion enclosing at least part of the substantially circular base, said frame being adapted to hold a battery, a first conductor extending from a first part of the curved portion to a second part of the curved portion, wherein a first end of the first conductor is positioned within the first part of the curved portion and wherein a second end of the first conductor is positioned within the second part of the curved portion, and a movable member being positioned on the curved portion and being adapted to provide an electrical connection between the second end of the first conductor and a point of contact within the second part of the curved portion.

The movable member may be movable by translation. The movable member may further comprise a button, wherein the electrical connection is provided by pushing said button.

The battery holder may further comprise a second conductor extending from the first part of the curved portion to the second part of the curved portion, wherein a first end of the second conductor is positioned within the first part of the curved portion and wherein a second end of the second conductor is positioned within the second part of the curved portion. The conductors—first and/or second may be positioned in grooves in the curved portion.

The movable member may be adapted to provide an electrical connection between the second end of the first conductor and the second end the second conductor. The point of contact within the second part of the curved portion may be connected to one of the electrodes of the battery. This may be the positive or negative electrode.

The first end of the first conductor may be electrically connected to an insert comprising one or more terminals. The one or more terminals may be connected to electronic components—e.g. ASIC's.

The present invention will now be described in further details with reference to the accompanying FIG. 1, which shows a 3D view of the battery holder with an integrated switch.

In FIG. 1, the frame of the battery holder (1) is seen. The battery holder is formed by a curved portion (2) and an inwardly tapered base (3) whereupon the battery, when inserted in the holder, will rest. The battery is intended to be positioned with the positive electrode facing up. The frame is preferably manufactured in one piece using a plastic material.

The curved portion (2) has an upper surface (4) and a lower surface (not shown in FIG. 1). A groove (7) is fabricated in both the upper and lower surface. Each groove is adapted to hold a conductor (5) or (6) connecting a first part of the curved portion with a second part of the curved portion. The first part contains a series of depressions (10)—in FIG. 1, four depressions are shown.

The conductors (5) and (6) terminate in two of the four depressions (10) so that electrical contact may be established between the conductors and the terminals (12) of the insert (11) when the insert (11) and the battery holder (1) are positioned in a face plate (not shown), and the battery holder is in a closed position.

A movable member formed by the top plate (8) and the bottom plate (9) is positioned on top of the battery holder (1). The movable member operates as a switch/contact for e.g. providing electrical contact between conductor (5) and conductor (6). The electrical connection is established by short-circuiting conductor (5) and conductor (6) with the metallic bottom plate (9).

Alternatively, the movable member can provide electrical contact between one of the conductors (5) or (6) and another point—e.g. one of the electrodes on the battery. For this purpose additional wiring is required.

The main purpose of having the switch positioned on top of the battery holder is related to the issue of saving space. By positioning the switch on top of the battery holder—and not beside the battery holder (e.g. on a face place)—saves important space which can be used for other electronic components—e.g. ASIC's.

The movable member can be implemented as a two or three position switch where the switch is activated by translating/sliding the top plate (8) and bottom plate (9). The direction of translation can be in one or two directions. In case of a two directional switch, neutral can be in the middle position whereas a first connection is established by moving the switch a certain distance in one direction. A second, and typically diferent connection, is established by moving the switch a certain distance in e.g. the opposite direction.

Alternatively, the switch can be implemented as a push-button switch where the switch is activated by pushing the button towards the battery in order to establish a predetermined electrical connection between two points.

Finally, a combination of the two above-mentioned types of switches can be implemented—e.g. a switch which is activated by sliding the switch combined with a push-button switch.

What is claimed is:

1. A battery holder for a microelectronic device, said battery holder comprising:

a frame having a substantially circular base and a curved portion with an upper and a lower surface, said curved portion enclosing at least part of the substantially circular base, said frame being adapted to hold a battery, a first conductor extending from a first part of the curved portion to a second part of the curved portion, wherein a first end of the first conductor is positioned within the first part of the curved portion and wherein a second end of the first conductor is positioned within the second part of the curved portion, and a movable member being positioned on the curved portion and being adapted to provide an electrical connection between the second end of the first conductor and a point of contact within the second part of the curved portion.

2. A battery holder according to claim 1, wherein the movable member is movable by translation.

3. A battery holder according to claim 1, wherein the movable member comprises a button, and wherein the electrical connection is provided by pushing said button.

4. A battery holder according to claim 1, further comprising a second conductor, said second conductor extending from the first part of the curved portion to the second part of the curved portion, wherein a first end of the second conductor is positioned within the first part of the curved portion and wherein a second end of the second conductor is positioned within the second part of the curved portion.

5. A battery holder according to claim 4, wherein the movable member is adapted to provide an electrical connection between the second end of the first conductor and the second end of the second conductor.

6. A battery holder according to claim 1, wherein the point of contact within the second part of the curved portion is connected to a battery electrode.

7. A battery holder according to claim 6, wherein the point of contact within the second part of the curved portion is connected to a positive electrode.

8. A battery holder according to claim 6, wherein the point of contact within the second part of the curved portion is connected to a negative electrode.

9. A battery holder according to claim 1, wherein the first end of the first conductor is electrically connected to an insert, said insert comprising one or more terminals.

10. A battery holder according to claim 1, wherein the first conductor is positioned in a groove in the curved portion.

* * * * *